(12) United States Patent
Romain (10) Patent No.: US 8,958,549 B2
(45) Date of Patent: Feb. 17, 2015

(54) COUNTERMEASURE METHOD AND DEVICE FOR PROTECTING DATA CIRCULATING IN AN ELECTRONIC COMPONENT

(75) Inventor: Fabrice Romain, Rians (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 719 days.

(21) Appl. No.: 13/007,116

(22) Filed: Jan. 14, 2011

(65) Prior Publication Data

US 2011/0176674 A1 Jul. 21, 2011

(30) Foreign Application Priority Data

Jan. 19, 2010 (FR) ...................................... 10 00202

(51) Int. Cl.
*H04L 9/00* (2006.01)
*G06F 21/00* (2013.01)
*H04L 9/06* (2006.01)

(52) U.S. Cl.
CPC .............. *H04L 9/0618* (2013.01); *H04L 9/002* (2013.01); *H04L 2209/12* (2013.01)
USPC ........................................... 380/29; 713/189

(58) Field of Classification Search
None
See application file for complete search history.

(56) References Cited

U.S. PATENT DOCUMENTS

| | | | | |
|---|---|---|---|---|
| 6,059,451 | A * | 5/2000 | Scott et al. ..................... | 714/726 |
| 6,400,824 | B1 * | 6/2002 | Mansoorian et al. ......... | 380/269 |
| 6,854,040 | B1 * | 2/2005 | Bartoli et al. ................. | 711/167 |
| 7,898,842 | B2 * | 3/2011 | Kuenemund .................. | 365/154 |
| 2004/0071288 | A1 | 4/2004 | Romain et al. ................. | 380/37 |
| 2004/0162991 | A1 * | 8/2004 | Teglia et al. ................... | 713/189 |
| 2008/0143561 | A1 * | 6/2008 | Miyato et al. .................. | 341/79 |
| 2008/0178060 | A1 * | 7/2008 | Takashi et al. ................ | 714/763 |

FOREIGN PATENT DOCUMENTS

| | | |
|---|---|---|
| JP | 2007195132 A | 8/2007 |
| WO | 00/19657 A1 | 4/2000 |

OTHER PUBLICATIONS

"Data Encryption Standard," Federal Information Processing Standards Publication (FIPS PUB) 46, National Bureau of Standards, Jan. 15, 1977, 20 pages.
Federal Information Processing Standards Publication 197, "Announcing the Advanced Encryption Standard (AES)", Nov. 26, 2001, 51 pages.
Bucci, M. et al., "A Power Consumption Randomization Countermeasure for DPA-Resistant Cryptographic Processors," PATMOS 2004, LNCS 3254:481-490, 2004.

* cited by examiner

*Primary Examiner* — Gilberto Barron, Jr.
*Assistant Examiner* — Abdulhakim Nobahar
(74) *Attorney, Agent, or Firm* — Seed IP Law Group PLLC (57) ABSTRACT

The present disclosure relates to a countermeasure method in an integrated circuit comprising at least one first logic circuit and at least one first input register supplying the first logic circuit with a datum, the method comprising steps of introducing a random datum into each first input register of the first logic circuit and of the first logic circuit reading the random datum in each first input register, then of introducing a datum to be processed into each first input register, and of the first logic circuit processing the datum in each first input register.

18 Claims, 4 Drawing Sheets

COUNTERMEASURE METHOD AND DEVICE FOR PROTECTING DATA CIRCULATING IN AN ELECTRONIC COMPONENT

BACKGROUND

1. Technical Field

The present disclosure relates to a countermeasure method for protecting sensitive data, circulating in an electronic component, against attacks aiming at discovering such data. It also relates to a portable device with a microcircuit, such as a smart card, implementing the method.

2. Description of the Related Art

Sensitive data can in particular be ciphering or deciphering keys, and more generally cryptographic data used or generated during cryptographic calculations, such as intermediate data of such calculations, and identifiers that must be kept secret.

Microcircuit devices handling sensitive data are sometimes the object of attacks aiming at determining such data. Amongst known attacks, SPA- (Simple Power Analysis) or DPA-type (Differential Power Analysis) attacks involve performing a statistical analysis of numerous measurements of currents and voltages entering and leaving the microcircuit upon the execution of a program by the microcircuit with various input data. The measurements obtained are used to deduce protected data that is processed or used by the microcircuit. With the same aim, EMA-type (Electromagnetic Analysis) attacks are based on the analysis of the electromagnetic radiation emitted by the microcircuit.

Attacks by error injection are also known which involve introducing disturbance into the microcircuit when it is executing sensitive algorithms such as cryptographic algorithms, or in order to trigger the execution of a downloading routine issuing stored data on a port. Such disturbance can be produced by applying to the microcircuit one or more brief lights or one or more voltage peaks on one of its contacts.

In order to fight these attacks that differ by nature, many quite different solutions have been found. The present disclosure relates more particularly to the solutions aiming to protect data when it is circulating in a microcircuit.

For this purpose, one well-known method involves ciphering each sensitive datum at the output of a memory or of a register or prior to sending it on a data bus, and deciphering the datum at the input of a register or of a memory or when it is received by a recipient entity of the datum. In reality, this solution only partially protects the data sent. Between the output of the deciphering circuit and the input of the register or of the memory, the datum circulates in circuits such as logic gates and multiplexers which produce a signature that is visible by an EMA- or SPA-type attack. The actual operation of writing in the memory or the register can also issue a signature.

It is also known to preload a register that is to receive a sensitive datum with a datum generated randomly to change the state of certain storing cells, and thus change the signature issued during the writing of a datum to be protected in the register. Patent application EP1475919 (US 2004/0162991) describes an anti-fraud method of injecting random data into output or intermediate registers, before they receive any sensitive data. This solution has the disadvantage of needing additional registers and multiplexers for each register to be protected. In addition, this solution protects registers, but not the logic circuits introducing the sensitive data into the protected registers. An attack by signature analysis can therefore make it possible to detect switches of logic gates of the logic circuits, and thus to determine sensitive data processed by these circuits.

Application WO 02/063821 describes a method for protecting a cryptographic calculation consisting of adding to the cryptographic calculation steps of masking input data and unmasking steps to restore the output data. This solution does not protect the logic circuits from attacks by signature analysis either.

It is therefore desirable to protect logic circuits and registers against attacks by signature analysis, without substantially increasing the complexity of the circuits.

BRIEF SUMMARY

One embodiment relates to a countermeasure method in an integrated circuit comprising at least one first logic circuit and at least one first input register supplying the first logic circuit with a datum to be processed, the method comprising steps of introducing a datum to be processed into each first input register, and of the first logic circuit reading the datum in each first input register.

According to one embodiment, the method comprises prior steps of introducing a random datum into each first input register of the first logic circuit and of the first logic circuit reading the random datum in each first input register.

According to one embodiment, the method comprises several successive processing phases each comprising steps of introducing a random datum into each first input register and of the logic circuit reading the random datum in each first input register, and steps of introducing a datum to be processed into each first input register and of the first logic circuit reading the datum to be processed in each first input register.

According to one embodiment, the method comprises successive steps of introducing a datum generated by the first logic circuit from each random datum introduced into each first input register, and a datum generated by the first logic circuit from each datum to be processed, into at least one second input register of a second logic circuit.

According to one embodiment, the random datum and the datum to be processed introduced successively into each first input register are supplied during previous steps by another logic circuit linked to an output of the first logic circuit.

According to one embodiment, the method comprises steps of introducing into each first input register a datum generated by the first logic circuit during a previous step from the random datum, then a datum generated by the first logic circuit during a previous step from the datum to be processed.

According to one embodiment, the first logic circuit performs ciphering functions compliant with the standard DES (Data Encryption Standard) or AES (Advanced Encryption Standard).

Some embodiments also relate to an electronic component comprising at least one first logic circuit and at least one first input register supplying the first logic circuit with a datum to be processed. According to one embodiment, the electronic component comprises a countermeasure device implementing the method previously defined. According to one embodiment, the electronic component comprises a second logic circuit and at least one second input register connected at the input of the second logic circuit and at the output of the first logic circuit, data generated by the first logic circuit from the random data, and data generated by the first logic circuit from the data to be processed, being successively introduced into the second input registers.

According to one embodiment, the electronic component comprises another logic circuit linked to an output of the first logic circuit and successively supplying each random datum, then each datum to be processed in each first register.

According to one embodiment, the electronic component comprises an additional register connected to each first input register of the first logic circuit to successively receive a datum generated by the first logic circuit from a random datum, then a datum generated by the first logic circuit from a datum to be processed.

According to one embodiment, the first logic circuit performs ciphering functions compliant with the standard DES or AES.

Some embodiments also relate to a portable device with a microcircuit comprising the electronic component previously defined.

BRIEF DESCRIPTION OF THE SEVERAL VIEWS OF THE DRAWINGS

Some examples of embodiments of the present disclosure will be described below in relation with, but not limited to, the appended figures, in which.

DETAILED DESCRIPTION

Figure 1:
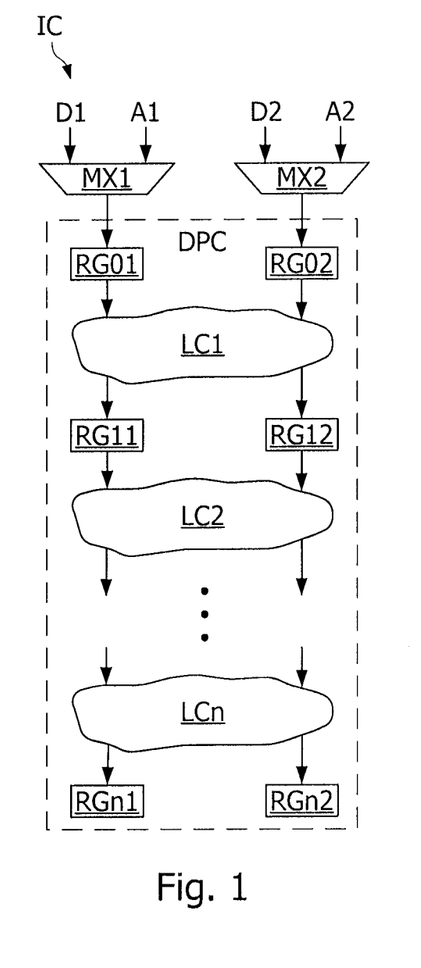
FIG. 1 schematically represents a data processing circuit of an integrated circuit, equipped with a countermeasure device according to one embodiment.

FIG. 1 represents an example of a data processing circuit DPC of an integrated circuit IC. The circuit DPC comprises logic circuits LC1, LC2, . . . LCn daisy-chain interconnected to perform a sequence of operations on data to be processed D1, D2 introduced into input registers RG01, RG02, and to supply output data in output registers RGn1, RGn2. Each logic circuit LC1-LCn is connected to input registers and output registers which can be the input registers of a next logic circuit in the daisy chain. Thus, the circuit LC1 is connected at input to the input registers RG01, RG02 and at output to registers RG11, RG12. The registers RG11, RG12 are connected at the input of the next logic circuit LC2. The logic circuit LCn constituting the last circuit in the chain supplies output data in the output registers RGn1, RGn2. The input data D1, D2 is processed by the next circuit of the processing cycles during each of which a datum is propagated from a register RG01, RG02, RG11, RG12 in a circuit LC1-LCn, to a register RG11, RG12, RGn1, RGn2. A datum is thus propagated from the first circuit LC1 of the chain, to the last circuit LCn and finally in the output registers RG1n, RG2n.

FIG. 1 represents only two input and/or output registers per logic circuit LC1-LCn for more clarity. It will be understood that each logic circuit can comprise one or more input registers and one or more output registers.

According to one embodiment, the integrated circuit IC comprises a countermeasure device comprising multiplexers MX1, MX2 for alternately introducing random data A1, A2 and data to be processed D1, D2 into the input registers RG01, RG02 of the chain of logic circuits LC1-LCn. Each of the multiplexers MX1, MX2 is connected at output to one of the input registers RG01, RG02, and comprises an input for receiving a datum to be processed D1, D2 and an input for receiving a datum of random value A1, A2. Upon each processing cycle, the multiplexers MX1, MX2 are controlled for alternately introducing data of random value A1, A2, and data to be processed D1, D2 into the input registers RG01, RG02 of the chain. At the end of a certain number of processing cycles depending on the number of logic circuits LC1-LCn thus connected, data resulting from random data A1, A2 appears in the output registers RG1n, RG2n, and upon a next processing cycle, output data resulting from the data to be processed D1, D2.

Thus, all the registers in the chain of logic circuits can be loaded with random data before receiving data to be processed D1, D2 or intermediate or output data, resulting from the data to be processed. Similarly, all the logic circuits in the chain are passed through by random data before being passed through by data to be processed D1, D2 or intermediate or output data resulting from the data to be processed. The transitions or switches of logic gates or of flip-flops of the logic circuits and registers, occurring during the propagation of the data to be processed in the chain, therefore depend on the values of the random data A1, A2 previously introduced into the chain. The result is that the signatures issued by these transitions or switches are hard to use to determine the value of the data processed.

Figure 2:
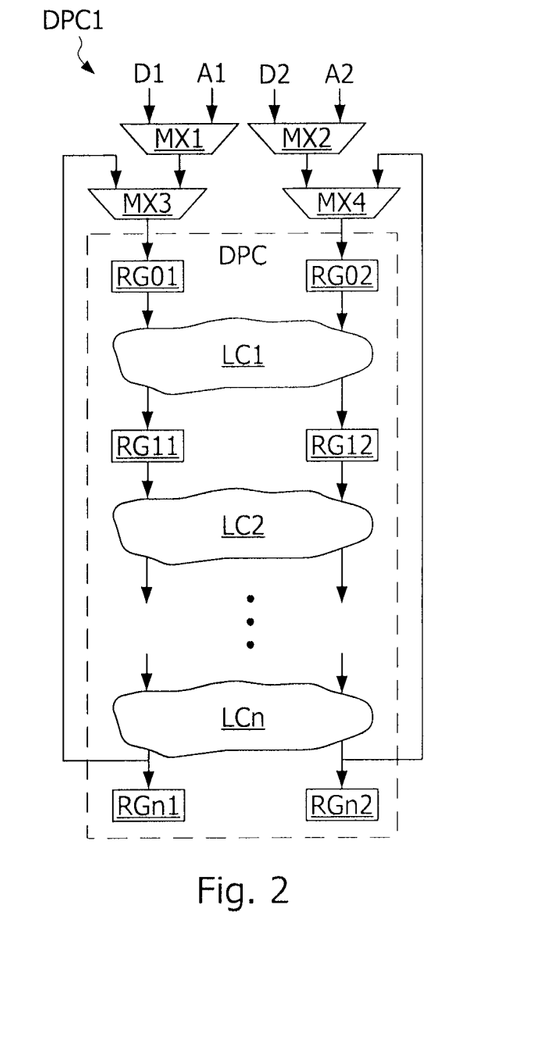
FIG. 2 schematically represents another data processing circuit, equipped with a countermeasure device according to one embodiment.

FIG. 2 represents another example of a data processing circuit DPC1 of an integrated circuit. The circuit represented in FIG. 2 is different from the one in FIG. 1 in that it carries out iterative processing. For this purpose, the outputs of the last logic circuit LCn in the chain are looped back at the input of the first logic circuit LC1 in the chain. The processing circuit DPC1 comprises the circuit DPC, and multiplexers MX3, MX4. Each of the multiplexers MX3, MX4 has an input connected to an output of the last logic circuit LCn in the chain of logic circuits of the circuit DPC. According to one embodiment, the circuit DPC1 comprises a countermeasure device. The countermeasure device comprises the multiplexers MX1, MX2, each connected at output to an input of the multiplexers MX3, MX4.

As in the circuit in FIG. 1, data of random value A1, A2 is introduced into the circuit DPC1 by the multiplexers MX1, MX2, during a first processing cycle, then data to be processed D1, D2 during a second processing cycle. At the end of a first iteration, corresponding to a certain number of processing cycles depending on the number of logic circuits LC1-LCn connected, data resulting from the random data A1, A2, then output data resulting from the data to be processed D1, D2 appears successively at the output of the last circuit LCn in the chain and is reintroduced during two successive processing cycles into the registers RG01, RG02 by the multiplexers MX3, MX4. Several iterations can thus be executed by the circuit DPC1 without introducing new random data upon each iteration.

As in the circuit in FIG. 1, all the registers in the chain of logic circuits can thus be loaded with random data before receiving data to be processed D1, D2 or intermediate or output data resulting from the data to be processed. Similarly, all the logic circuits in the chain are passed through by random data before being passed through by data to be processed D1, D2 or intermediate or output data resulting from the data to be processed.

It shall be noted that other arrangements of the multiplexers MX1-MX4 can be provided without changing the operation of the circuit. Thus, the outputs of the logic circuit LCn can be connected to inputs of the multiplexers MX1, MX2, and random data can be introduced at an input of the multiplexers MX3, MX4. The multiplexers MX1-MX4 can also be replaced by multiplexers with three inputs respectively receiving a datum to be processed, a random datum and an output of the circuit LCn.

Figure 3:
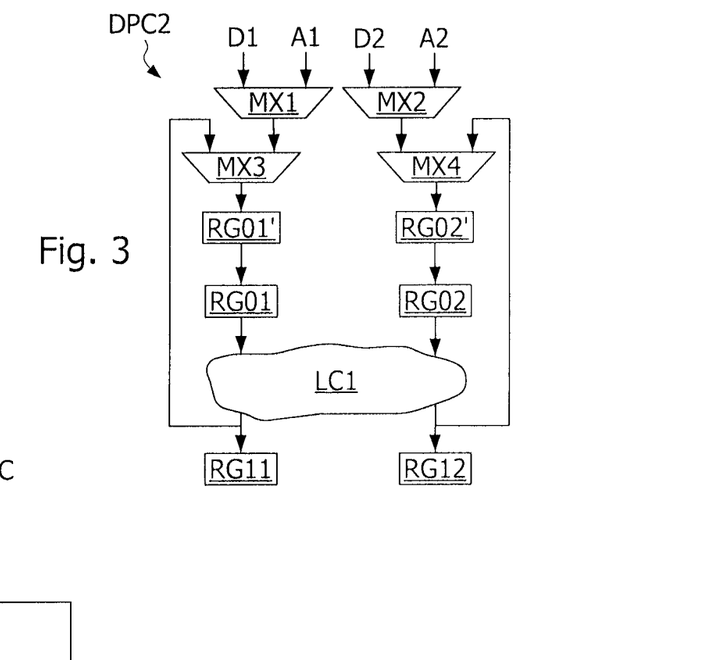
FIG. 3 schematically represents another data processing circuit, equipped with a countermeasure device according to one embodiment.

FIG. 3 represents another example of a data processing circuit DPC2 of an integrated circuit. The circuit DPC2 differs from the one in FIG. 2 in that it comprises only a single logic circuit without any internal registers, i.e., the circuit LC1 the outputs of which are looped back directly at the input of the circuit LC1. The processing circuit DPC2 further comprises the multiplexers MX3, MX4, and a countermeasure device. The countermeasure device comprises the multiplexers MX1, MX2 connected at output respectively to an input of the multiplexers MX3, MX4, and registers RG01', RG02' connected respectively to the outputs of the multiplexers MX3, MX4 and to the registers RG01, RG02.

As in the circuit in FIG. 2, data of random value A1, A2, is introduced into the circuit DPC2 by the multiplexers MX1, MX2, during a first processing cycle, then data to be processed D1, D2 during a second processing cycle. Thus, during the first processing cycle, the registers RG01', RG02' receive the data A1, A2. During the second processing cycle, the data A1, A2 is transferred from the registers RG01', RG02' into the registers RG01, RG02, and the data to be processed D1, D2 is introduced into the registers RG01', RG02' thus released. During a third processing cycle, the data A1, A2 is transferred into the circuit LC1 which produces new data that is introduced into the registers RG01' and RG02'. In parallel, the data D1, D2 is transferred from the registers RG01', RG02' into the registers RG01, RG02. During a fourth processing cycle, the data D1, D2 is transferred into the circuit LC1 which produces new data that is introduced into the registers RG01' and RG02'. In parallel, the data A11, A12 is transferred from the registers RG01', RG02' into the registers RG01, RG02. Several data D1, D2 processing cycles can thus be executed by the circuit DPC2 without introducing new random data every two processing cycles and still maintaining ciphered data.

As in the circuit in FIG. 2, all the registers and the logic circuits of the circuit DPC2 can thus be loaded with random data before receiving data to be processed D1, D2 or intermediate or output data resulting from the data to be processed.

It shall be noted that other arrangements of the registers RG01, RG02, RG01', RG02' and of the multiplexers MX1-MX4 can be considered without modifying the general function of the circuit. Thus, the registers RG01', RG02' can be arranged on the return lines of the circuit LC1 at the input of the multiplexers MX3, MX4. In one embodiment, the number of registers at each input of the logic circuit LC1 is equal to or greater than 1. In another embodiment, when an input channel is also a return channel between an output and an input of the circuit LC1, the number of registers on each return channel is equal to or greater than 2. The registers RG01' and RG02' can be removed if the output registers RG11, RG12 of the circuit LC1, and not the outputs thereof, are connected at the input of the multiplexers MX3, MX4. Moreover, the return lines and the inputs of random data can be inverted between the multiplexers MX1 and MX3 firstly, and secondly, between the multiplexers MX2 and MX4. The number of data inputs to be processed of the circuit DPC2 can also be equal to 1 or greater than 2.

In the circuits represented in FIGS. 1 to 3, it can be noticed that the countermeasure device only comprises a small number of components (one multiplexer and possibly one register per circuit input).

Figure 4:
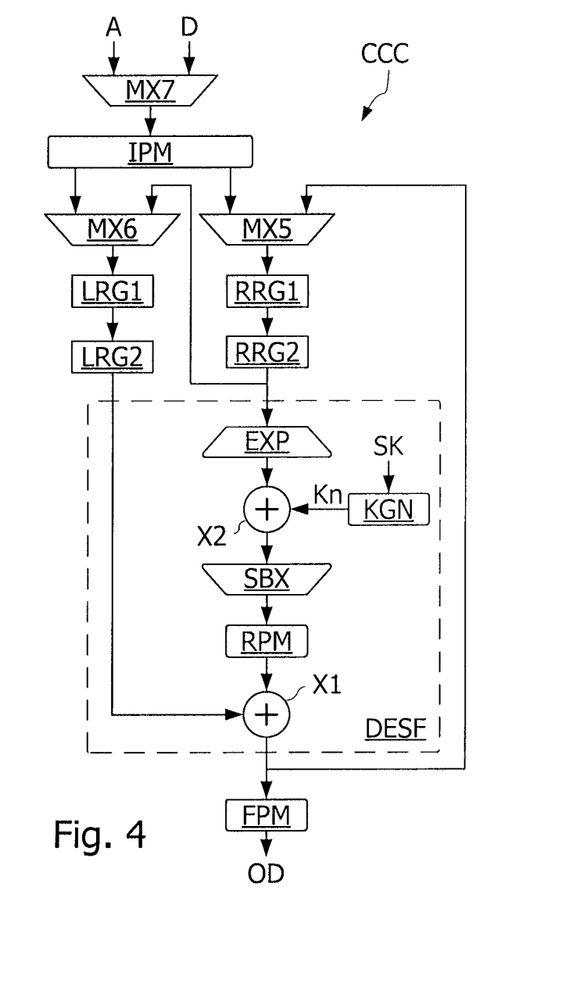
FIGS. 4 and 5 schematically represent a logic circuit of cryptographic calculation, equipped with a countermeasure device according to two distinct embodiments.

The countermeasure device described with reference to FIG. 2 or 3 is adapted to the protection of an iterative cryptographic calculation circuit. Therefore, FIG. 4 represents a cryptographic calculation circuit implementing the DES (Data Encryption Standard). For further details about the DES, the document "Data Encryption Standard FIPS PUB 46" published on 15 Jan. 1977 can be referred to. In FIG. 4, the cryptographic calculation circuit CCC comprises a permutation logic circuit IPM implementing an initial permutation function complying with the DES, multiplexers MX5, MX6, input registers RRG1, LRG1, a logic circuit DESF implementing a cryptographic function of the DES, and a permutation logic circuit FPM implementing a final permutation function complying with the DES.

According to one embodiment, the circuit CCC comprises a countermeasure device comprising a multiplexer MX7, and registers RRG2, LRG2. The multiplexer MX7 receives at input a datum to be ciphered D and a datum of random value A. The output of the multiplexer MX7 is connected to an input of the circuit IPM. The circuit IPM comprises two outputs connected to an input of the multiplexers MX5 and MX6, respectively. An output of the multiplexer MX5 is connected to the register RRG1, which is connected to the register RRG2. The register RRG2 is connected to an input of the multiplexer MX6 and to an input of the circuit DESF. The output of the multiplexer MX6 is connected to the register LRG1, which is connected to the register LRG2. The register LRG2 is connected to an input of the circuit DESF. An output of the circuit DESF is connected to an input of the multiplexer MX5 and to an input of the circuit FPM that supplies a ciphered datum OD.

The circuit DESF classically comprises an expansion logic circuit EXP, two adders of Exclusive OR type X1, X2, a substitute logic circuit SBX, and a permutation circuit RPM. The circuit EXP is connected to the register RRG2 and converts by logic operations, for example a word of 32 bits at input into a word of 48 bits. An output of the circuit EXP is connected to an input of the adder X2. Another input of the adder X2 receives a secret key Kn, for example of 48 bits, generated using a ciphering key SK for a ciphering iteration by a key generator KGN complying with the DES. An output of the adder X2 is connected to an input of the circuit SBX which performs substitute logic operations converting the input word, for example of 48 bits, into a word of 32 bits. An output of the circuit SBX is connected to an input of the circuit RPM. An output of the circuit RPM is connected with the register LRG2 to inputs of the adder X1 an output of which is connected to the output of the circuit DESF.

The content of the registers of the circuit CCC during different cryptographic calculation cycles is indicated in Table 1 below:

TABLE 1

| Cycle No. | RRG1 | RRG2 | LRG1 | LRG2 |
|---|---|---|---|---|
| 1 | AR0 | / | AL0 | / |
| 2 | DR0 | AR0 | DL0 | AL0 |
| 3 | AR1 | DR0 | AR0 | DL0 |
| 4 | DR1 | AR1 | DR0 | AR0 |
| ... | ... | ... | ... | ... |
| 2n + 1 | ARn | DRn − 1 | ARn − 1 | DRn − 2 |
| 2n + 2 | DRn | ARn | DRn − 1 | ARn − 1 |

During a first calculation cycle, a random datum A is introduced into the calculation circuit CCC by the multiplexer MX7. The datum A is processed by the circuit IPM and divided into a right part AR0 introduced into the register RRG1 and a left part AL0 introduced into the register LRG1. During a second calculation cycle, the data in the registers RRG1, LRG1 is transferred into the registers RRG2, LRG2, and the multiplexer MX7 introduces a datum to be ciphered D into the circuit CCC. In turn, the datum D is processed by the circuit IPM and divided into a right part DR0 introduced into the register RRG1 and a left part DR0 introduced into the register LRG1. During a third calculation cycle, the data AR0, AL0 in the registers RRG2, LRG2 is supplied to the circuit DESF. The data DR0, AR0, DR0 in the registers RRG1, RRG2, LRG1 is transferred respectively into the registers RRG2, LRG1, LRG2. The adder X1 supplies a new datum AR1 obtained from the data AR0, AL0 in the following manner:

$$AR1 = AL0 \oplus F(AR0, K0) \quad (1)$$

wherein $\oplus$ is the Exclusive OR operator, K0 is a first key generated from the encryption key SK by the generator KGN, and $$F(X,K) = RPM(SBX(EXP(X) \oplus K))) \quad (2)$$

RPM, SBX and EXP being the functions represented in FIG. 4.

The datum obtained AR1 at the output of the adder X1 is transferred into the register RRG1.

During a fourth calculation cycle, the data DR0, DR0 in the registers RRG2, LRG2 is supplied to the circuit DESF. The data AR1, DR0, AR0 in the registers RRG1, RRG2, LRG1 is transferred respectively into the registers RRG2, LRG1, LRG2. The adder X1 supplies a new datum DR1 obtained from the data DR0, DR0 in the following manner:

$$DR1 = DR0 \oplus F(DR0, K0) \quad (3)$$

The datum DR1 obtained at the output of the adder X1 is transferred into the register RRG1.

During a calculation cycle 2n+1, the registers RRG1, RRG2, LRG1, LRG2 contain the data DRn−1, ARn−1, DRn−2, ARn−2. The data ARn−1, ARn−2 is introduced into the circuit DESF and the data DRn−1, ARn−1, DRn−2 is transferred into the registers RRG2, LRG1, LRG2. The adder X1 supplies the datum ARn obtained in the following manner:

$$ARn = (ARn-2) \oplus F(ARn-1, Kn) \quad (4)$$

in which Kn is an nth key generated from the encryption key SK by the generator KGN. The datum ARn obtained is transferred into the register RRG1.

During a calculation cycle 2n+2, the data DRn−1, DRn−2 is sent to the circuit DESF and the data ARn, DRn−1, ARn−1 in the registers RRG1, RRG2, LRG1 is transferred into the registers RRG2, LRG1, LRG2. The adder X1 supplies the datum DRn obtained in the following manner:

$$DRn = (DRn-2) \oplus F(DRn-1, Kn) \quad (5)$$

The datum DRn obtained is transferred into the register RRG1.

It can be observed in Table 1 that each register is occupied alternately during each calculation cycle either by a datum resulting from the initial random value A, or by a datum resulting from the datum to be ciphered D.

None of the previous formulas (1) and (3) to (5) refers both to data resulting from the datum to be processed D and to data resulting from the random datum A. Furthermore, the circuit DESF receives during each calculation cycle either data resulting from the initial random datum A, or data resulting from the datum to be ciphered D. It can also be observed that a new key SKn is generated every two calculation cycles.

According to the formulas (4) and (5), the circuit CCC calculates the terms of a second-order recursively defined sequence (each term of the sequence of rank n is calculated according to the previous terms of ranks n−1 and n−2 of the sequence). The four registers RRG1, RRG2, LRG1, LRG2 are therefore provided for storing alternately the terms n−1 and n−2 of a sequence of data resulting from the random datum A, and the terms n−1 and n−2 of a sequence of data resulting from the datum to be processed D.

Here again, other arrangements of the multiplexers and of the registers can be provided without modifying the general function of the circuit CCC. Thus, one of the registers RRG1, RRG2 can be interposed on the link between the adder X1 and the input of the multiplexer MX5, and one of the registers LRG1, LRG2 can be interposed on the link between the input of the circuit DESF and the input of the multiplexer MX6. This solution offers the advantage of obtaining a calculation iteration of the datum to be processed during the third calculation cycle instead of the fourth.

Figure 5:
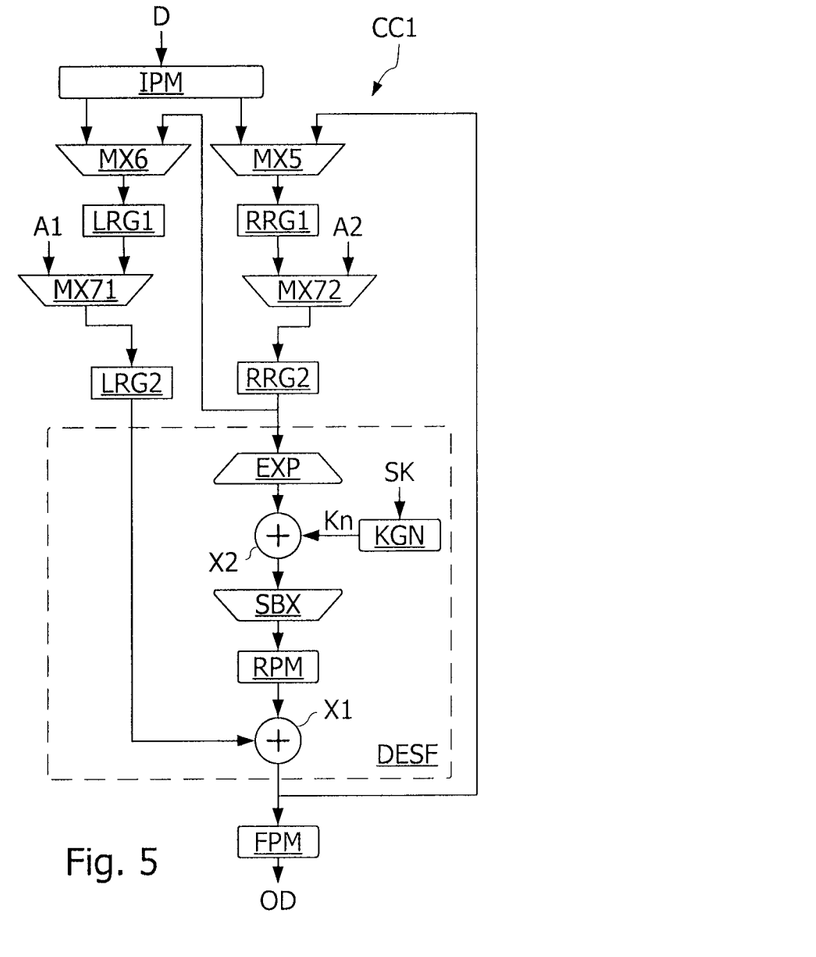

A calculation cycle can also be avoided by introducing random data directly into the registers LRG2 and RRG2. Thus, FIG. 5 represents a cryptographic calculation circuit CC1 which differs from the circuit CCC in that the multiplexer MX7 is removed and in that two multiplexers MX71, MX72 are inserted respectively between the registers LRG1 and LRG2, and between the registers RRG1 and RRG2. During a first calculation cycle, each of the registers MX71, MX72 receives a random datum A1, A2, while the registers LRG1 and LRG2 receive a datum resulting from the datum to be processed D. The processing is continued during the next cycles as described previously with reference to FIG. 4.

The deciphering process complying with the DES is identical to the ciphering process, except that the keys SKn are generated in an order that is the opposite of the one in which they are generated during the ciphering. Therefore, the circuit CCC or CC1 can also be used to decipher a datum.

Figure 6:
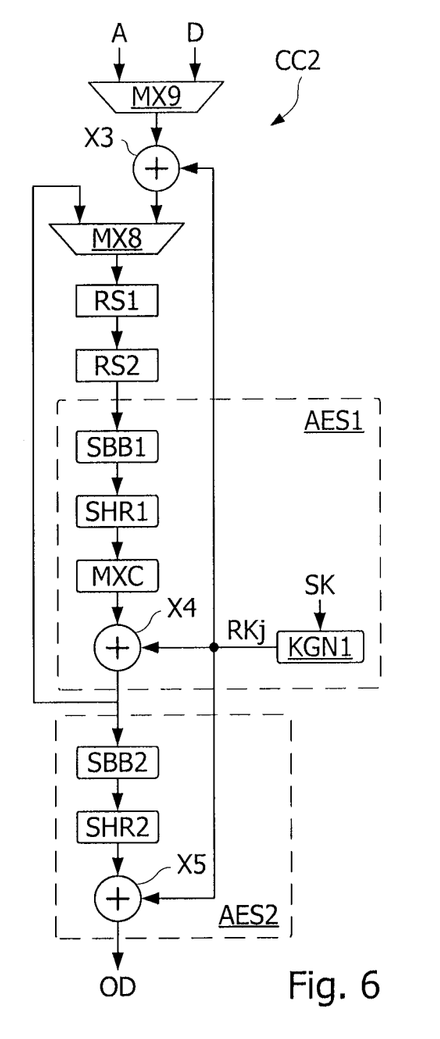
FIGS. 6 and 7 schematically represent a logic circuit of cryptographic calculation, equipped with a countermeasure device according to two distinct embodiments.

The countermeasure device described with reference to FIG. 2 or 3 is also adapted to the protection of an iterative cryptographic calculation circuit implementing the AES (Advanced Encryption Standard). FIG. 6 represents a cryptographic calculation circuit implementing the AES. For further details about the AES, the document "Advanced Encryption Standard FIPS PUB 197" published on 26 Nov. 2001 can be referred to. In FIG. 6, the cryptographic calculation circuit CC2 comprises an adder of Exclusive OR type X3, a multiplexer MX8, a register RS1, and two logic circuits AES1, AES2 implementing cryptographic functions of the AES, the logic circuit AES2 supplying a ciphered datum OD. The circuit AES1 comprises a first substitute calculation circuit SBB1, a first row-based circular permutation calculation circuit SHR1, a column-based permutation calculation circuit MXC, an adder of Exclusive OR type X4, and a key generator KGN1. The circuit AES2 comprises a second substitute calculation logic circuit SBB2, a second row-based circular permutation calculation circuit SHR2, and an adder of Exclusive OR type X5. The logic circuits SBB1, SHR1, MXC, SBB2, SHR2 and KGN1 are compliant with the AES.

According to one embodiment, the circuit CC2 comprises a countermeasure device comprising a multiplexer MX9 and a register RS2. The multiplexer MX9 receives at input a datum to be ciphered D and a datum of random value A. The output of the multiplexer MX9 is connected to an input of the adder X3 receiving at another input a key RKj supplied by the key generator KGN1. The output of the adder X3 is connected to an input of the multiplexer MX8. The output of the multiplexer MX8 is connected to the register RS1 which is connected to the register RS2. The register RS2 is connected to an input of the circuit SBB1. One output of the circuit SBB1 is connected to an input of the circuit SHR1. One output of the circuit SHR1 is connected to an input of the circuit MXC. One output of the circuit MXC is connected to an input of the adder X4 receiving at another input the key RKj supplied by the key generator KGN1. One output of the adder X4 is connected to an input of the multiplexer MX8 and to an input of the circuit SBB2 one output of which is connected to an input of the circuit SHR2. One output of the circuit SHR2 is connected to an input of the adder X5 receiving at another input a last key RKn supplied by the key generator KGN1. When a certain number of calculation cycles has been performed (10, 12 or 14, in accordance with the AES) by the circuit AES1, the output of the adder X4 is introduced into the circuit AES2 which supplies a ciphered datum OD. One of the registers RS1, RS2 can also be interposed on the link between the output of the adder X4 and the input of the multiplexer MX8.

During a first calculation cycle, a random datum A is introduced into the calculation circuit CC2 by the multiplexer MX9. The datum A is processed by the adder X3 which adds to it a first key RK0 generated by the circuit KGN1 using a secret key SK. The adder X3 supplies a datum A⊕RK0 which is stored in the register RS1. During a second calculation cycle, a datum to be ciphered D is introduced into the calculation circuit CC2 by the multiplexer MX9. The datum D is processed by the adder X3 which adds the first key RK0 to it. The adder X3 supplies a datum D⊕RK0. The datum A⊕RK0 is transferred into the register RS2 and the datum D⊕RK0 is stored in the register RS1. During a third calculation cycle, the datum A⊕RK0 is processed by the circuit AES1. The datum D⊕RK0 is transferred into the register RS2 and the resulting datum supplied by the adder X4 is transferred into the register RS1. During a fourth calculation cycle, the datum D⊕RK0 is processed by the circuit AES1. The datum resulting from the datum A in the register RS1 is transferred into the register RS2 and the datum resulting from the datum D supplied by the adder X4 is transferred into the register RS1. During a calculation cycle 2n+1, n being the number of iterations to be done on a datum to cipher it, the adder X5 supplies a datum depending only on the random datum A. During a calculation cycle 2n+2, the adder X5 supplies a ciphered datum depending only on the datum D.

In the circuit CC2, each register RS1, RS2 is occupied alternately during each calculation cycle either by a datum depending on the random datum A, or by a datum depending on the datum to be ciphered D. The circuits AES1, AES2 are also passed through alternately either by a datum depending on the random datum A, or by a datum depending on the datum to be ciphered D.

The circuit CC2 calculates the terms of a first-order recursively defined sequence (each term of the sequence of rank n is calculated according to the previous term of rank n−1 of the sequence). The circuit may be implemented with just two registers RS1, RS2 provided for storing the terms n−1 resulting from the random datum A and from the datum to be processed D.

Figure 7:
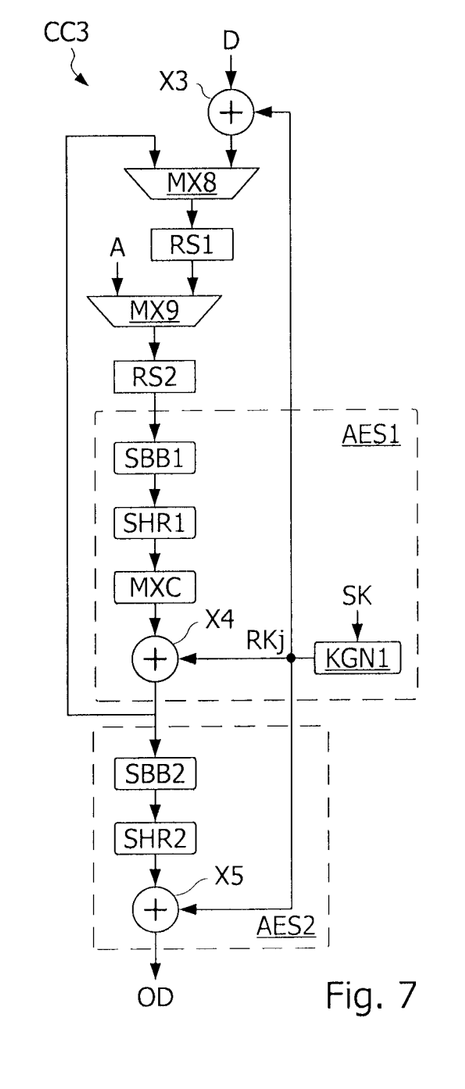

Here again, a random datum A can be introduced directly into the register RS2, instead of being introduced into the register RS1, which also enables one calculation cycle to be avoided. Thus, FIG. 7 represents a cryptographic calculation circuit CC3 which differs from the circuit CC2 in that the multiplexer MX9 is not placed at the input of the circuit but between the registers RS1 and RS2. During a first calculation cycle, the register MX9 receives a random datum A, while the register LS1 receives a datum coming from the datum to be processed D. The processing is continued during the next cycles as described previously with reference to FIG. 6. The key generator KGN1 is also changed compared to the one in FIG. 6, so as to supply the first key RK0 only once instead of twice.

A deciphering circuit complying with the AES can be produced in a manner similar to the ciphering circuit CC2 or CC3, by replacing the circuits SBB1, SBB2, SHR1, SHR2 and MXC with circuits performing opposite operations.

It will be understood by those skilled in the art that various alternative embodiments and various applications of the present disclosure are possible. In particular, the present disclosure is not limited to the implementation of a multiplexer for introducing alternately into a register or into a logic circuit a random datum and a datum to be processed. Other components carrying out this function can easily be designed by those skilled in the art.

The present disclosure can be applied not only to an integrated circuit, but also to any component requiring protection against attacks aiming at discovering secret data.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A countermeasure method in an integrated circuit, comprising:
    introducing a first datum into a first input of a first input register;
    reading the first datum from the first input register using a first logic circuit;
    prior to the introducing and reading, introducing a first random datum into the first input of the first input register;
    reading the first random datum from the first input register by the first logic circuit prior to introducing the first datum into the first input register;
    ciphering the first random datum and the first datum within the first logic circuit via at least one logic function having the first random datum and the first datum as inputs;
    introducing a first output datum generated by the first logic circuit from the first random datum into a first input of a second input register;
    introducing a second output datum generated by the first logic circuit from the first datum into the first input of the second input register; and
    feeding the first random datum back to a second input of the second input register.

2. The method according to claim 1, comprising reiteratively:
    introducing the first random datum into the first input register;
    reading the first random datum from first input register using the first logic circuit;
    introducing a second datum into the first input register; and
    reading the second datum from the first input register using the first logic circuit.

3. The method according to claim 1 wherein the first random datum and the first datum introduced into the first input register are supplied into the first input register by another logic circuit that is coupled to an output of the first logic circuit.

4. The method according to claim 1, comprising:
introducing into the first input register a first output datum generated by the first logic circuit from the first random datum; and
introducing into the first input register a second output datum generated by the first logic circuit from the first datum after introducing into the first input register the first output datum generated by the first logic circuit from the first random datum.

5. The method according to claim 4, wherein the first logic circuit performs ciphering functions compliant with one of the DES and AES standards.

6. The method according to claim 1, comprising:
performing an exclusive OR operation on the first datum with a key generated within the first logic circuit prior to introducing the first datum at the first logic circuit.

7. An electronic component, comprising:
a first logic circuit;
a second logic circuit;
a first register circuit configured to receive a first random datum and a first datum and supply the first random datum and the first logic circuit with the first datum;
a second register circuit coupled to an input of the second logic circuit and to an output of the first logic circuit, wherein a first output data generated by the first logic circuit from the first random datum and a second output data generated by the first logic circuit from the first datum are successively introduced into an input of the second register circuit; and
a countermeasure device configured to introduce the first random datum into a first input of the first register circuit prior to the first register circuit receiving the first datum, the first logic circuit configured to read the first random datum from the first register circuit prior to the first datum being introduced into the first register circuit, the first logic circuit configured to cipher the first random datum and the first datum via at least one logic function, the countermeasure device configured to feed the first random datum back into a second input of the first register circuit.

8. The electronic component according to claim 7, comprising:
a third logic circuit coupled to the output of the first logic circuit and configured to successively supply a plurality of random data and a plurality of first data into the first register circuit, wherein the plurality of random data includes the first random datum and the plurality of first data includes the first datum.

9. The electronic component according to claim 8, further comprising:
a third register circuit connected to the first register circuit to successively receive the plurality of first data generated by the first logic circuit.

10. The electronic component according to claim 7 wherein the first logic circuit is configured to perform ciphering functions compliant with one of the DES and AES standards.

11. A portable device, comprising:
an electronic circuit, including:
a first logic circuit configured to cipher a first random datum and a first datum via at least one logic function;
a second logic circuit;
a first input register circuit configured to receive a first random datum and a first datum and supply the first logic circuit with the first random datum and the first datum;
a second register circuit coupled to an input of the second logic circuit and to an output of the first logic circuit, wherein a first output data generated by the first logic circuit from the first random datum and a second output data generated by the first logic circuit from the first datum are successively introduced into an input of the second register circuit; and
a countermeasure device configured to feedback the first random datum into a second input of the first input register circuit prior to the first input register circuit receiving the first datum, the first logic circuit being configured to read the first random datum from the first input register circuit prior to the first datum being introduced into the first input register circuit.

12. The portable device according to claim 11, wherein the first logic circuit includes a key generator configured to generate at least one key, the portable device further comprising a first exclusive OR operator configured to receive the at least one key and operate on the at least one key and the first random datum before the first datum is received by the first input register circuit.

13. The electronic circuit according to claim 11, further including a first switch being coupled to an input of the first input register circuit, the first switch being configured to alternately introduce the first random datum and the first datum into the first input register circuit.

14. The electronic circuit according to claim 13, further including a second switch coupled to an output of the first input register circuit, the second switch configured to alternately advance a second random datum and the output of the first input register circuit into the first logic circuit.

15. The electronic circuit according to claim 14 wherein an output of the second switch is coupled to a second exclusive OR operator within the first logic circuit.

16. A countermeasure method in an integrated circuit, comprising:
alternately introducing a random data and a nonrandom data into a first input of a first input register;
alternately advancing the random data and the nonrandom data from the first input register to a second input register;
receiving the random data and the nonrandom data at a logic circuit from the second input register;
ciphering the received random data and nonrandom data within the logic circuit by operating at least one logic function on the random and nonrandom data; and
after ciphering by the logic circuit, feeding the random data back to a second input of the first input register; and
alternately introducing a first output datum generated by the logic circuit from the random data into a first input of a second input register and a second output datum generated by the first logic circuit from the nonrandom data into the first input of the second input register.

17. The countermeasure method of claim 16 wherein the at least one logic function includes an exclusive OR and ciphering includes exclusive ORing the nonrandom data with a generated key.

18. The countermeasure method of claim 16 wherein after ciphering by the logic circuit, feeding the random data back to the second input of the first register includes switchably blocking the nonrandom data from being fed back to the first input of the first register.

* * * * *